United States Patent [19]

Scheidel et al.

[11] Patent Number: 5,129,687
[45] Date of Patent: Jul. 14, 1992

[54] SWIVELLING CONDUIT, IN PARTICULAR FOR THE AIR-CONDITIONING SYSTEM OF THE PASSENGER SPACE OF A MOTOR VEHICLE

[75] Inventors: Wolfgang Scheidel, Bühl; Jürgen Stenger, Ettlingen; Albert Van Wijhe, Bühlertal, all of Fed. Rep. of Germany

[73] Assignee: Robert Bosch GmbH, Stuttgart, Fed. Rep. of Germany

[21] Appl. No.: 602,293
[22] PCT Filed: May 17, 1989
[86] PCT No.: PCT/DE89/00311
§ 371 Date: Nov. 16, 1990
§ 102(e) Date: Nov. 16, 1990
[87] PCT Pub. No.: WO89/11980
PCT Pub. Date: Dec. 14, 1989

[30] Foreign Application Priority Data

Jun. 1, 1988 [DE] Fed. Rep. of Germany ....... 3818565

[51] Int. Cl.⁵ .................. F16K 41/00; F16C 27/00
[52] U.S. Cl. .................................. 285/273; 384/296; 384/215
[58] Field of Search ............... 384/215, 220, 295, 296, 384/902, 905.1; 285/273, 404, 264, 265; 98/2

[56] References Cited

U.S. PATENT DOCUMENTS

| | | | |
|---|---|---|---|
| 3,874,752 | 4/1975 | Imazaike | 384/296 |
| 3,966,276 | 6/1976 | Bellarbre et al. | 384/215 |
| 4,339,991 | 7/1982 | Asano et al. | 98/2 |
| 4,358,166 | 11/1982 | Antoine | 384/215 |
| 4,402,486 | 9/1983 | Jacquet | 98/2 |
| 4,498,790 | 2/1985 | Fisher | 384/296 |
| 4,624,585 | 11/1986 | Nix et al. | 384/296 |
| 4,655,614 | 4/1987 | Schott | 384/215 |
| 4,750,410 | 6/1988 | Parker | 98/2 |
| 4,765,674 | 8/1988 | Svensson | 384/296 |
| 4,887,331 | 12/1989 | Thomas | 384/296 |

FOREIGN PATENT DOCUMENTS 2483559 5/1981 France .

Primary Examiner—Eric K. Nicholson
Attorney, Agent, or Firm—Michael J. Striker

[57] ABSTRACT

A swivelable conduit is suggested which serves to deflect the air to be guided to the passenger space of a motor vehicle. The conduit comprises two pivot mountings which are flush with one another and are arranged at a distance from one another at a stationary structural element, preferably at the wall of an air duct; the pivot mountings comprise a bearing bush connected with one of the two elements and a bearing pin connected with the other element and in which the two bearing elements are provided with shoulder surfaces and counter-shoulder surfaces, respectively, which face one another and which define a relative movement of the two bearing elements which is directed in the direction of the swivel axis, and the bore hole wall surface of every bearing bush guides the two structural elements radially relative to the swivel axis in cooperation with an outer surface area of the bearing pin assigned to it. In order to eliminate in a simple, economical manner the axial play, which is very difficult to eliminate in these pivot mountings, as well as the radial play, which can only be prevented at a high cost, at least one of the surfaces of the bearing elements cooperating with one another comprises at least one elastically deformable portion which, in the relaxed state, projects over the contour which it occupies in the installed state, and accordingly in the tensioned state.

18 Claims, 2 Drawing Sheets

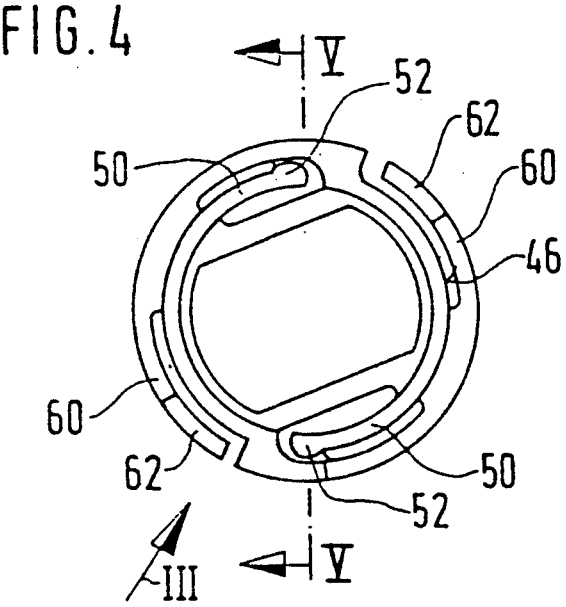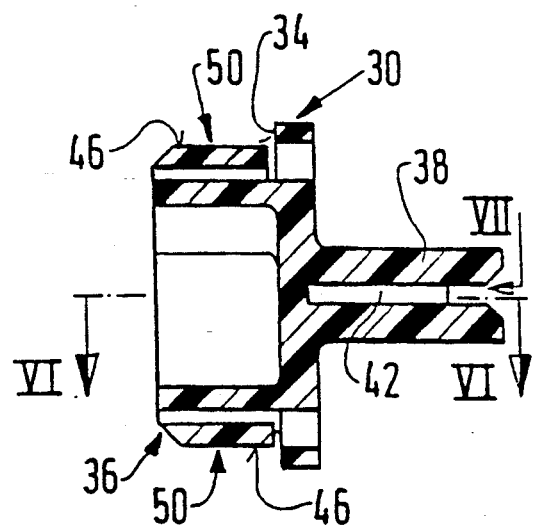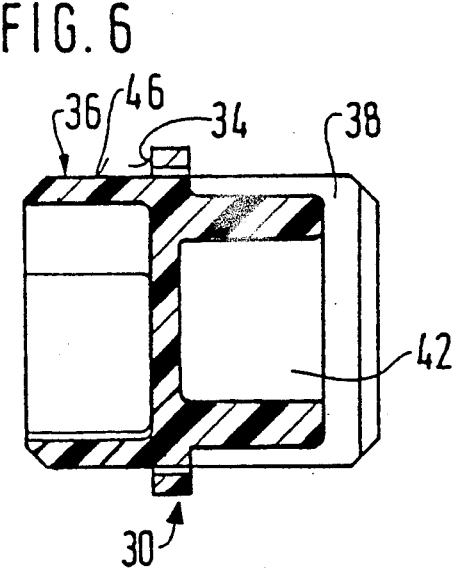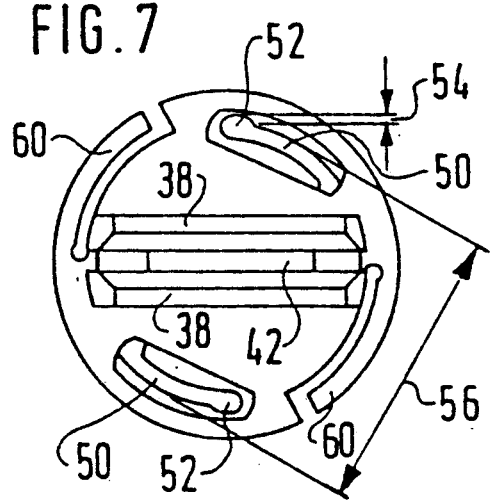

SWIVELLING CONDUIT, IN PARTICULAR FOR THE AIR-CONDITIONING SYSTEM OF THE PASSENGER SPACE OF A MOTOR VEHICLE

BACKGROUND OF THE INVENTION

The present invention relates to a swivelable conduit particularly for an air-conditioning system of passenger space of motor vehicles. A conduit of this type is already known, in which axial play is accepted as unavoidable and in which a felt ring is arranged in order to eliminate the radial play of the pivot mounting, which felt ring is supposed to compensate for this play. In addition to the costs incurred because of the mounting of the felt ring, the wall must comprise an opening, since the felt ring can only be mounted from the outside. However, such an opening can then no longer be sealed at a reasonable cost. In many cases, the axial play which cannot be eliminated also leads to rattling noises which should be prevented.

SUMMARY OF THE INVENTION

In accordance with the invention, a swivelable conduit is provided which is guided at a stationary structural element via two pivot mountings which are flush with one another and arranged at a distance from one another, wherein the pivot mountings comprise a bearing bush connected with one of the two elements in a bearing pin connected with the other element and in which the two bearing elements are provided with should surfaces and counter-shoulder surfaces facing one another and defining a relative movement of the two bearing elements which is directed in the direction of the swivel axis, wherein in accordance with the present invention at least one of the surfaces of the bearing elements, which surfaces cooperate with one another has at least one elastically deformable portion which in a relaxed state projects over the contour which is occupied in an installed state and accordingly in a tensioned state.

The swivelable conduit according to the invention has the advantage that the elastically deformable portions, when pretensioned in the assembled state of the pivot mounting and supported at the other bearing surface, eliminate all unwanted bearing play, so that the mounting e.g. of a felt ring can be dispensed with.

Therefore, the mounting opening can also be dispensed with, so that the air duct in the area of the pivot mounting for the swiveling element can be constructed so as to be absolutely tight.

In accordance with another feature of the present invention, the elastically deformable portion of one surface is opposed by a relatively inelastic portion of the area of the other surface cooperating with this surface.

The bearing pin can be constructed as a separate structural component part which is connectable with the elements, and can be rotatably supported in a bearing bush of the stationary structural element.

On the other hand, the bearing pin can be provided with an annular collar which comprises at least one portion which can deflect elastically in the direction of the rotating axis of the pin. This portion of the annular collar can be constructed as an arm extending along a predetermined angle around the rotating axis of the pin, securely connected at one end with the annular collar, and cooperating with an annular surface of the bearing bush acting as a counter shoulder.

The arm can be provided at its free end with a cam which projects over the annular end face forming a shoulder surface and facing in the direction of the rotating axis of the pin. The arm, with its surface located opposite the cam, can jump back relative to a plane which is formed by the end face of the annular collar remote of the outer surface area of the bearing pin.

The bearing pin can have a projection at the end face of the annular collar remote of the outer surface area of the bearing pin.

The bearing pin can have a projection at the end of the annular collar remote of its outer surface area, which projecting is provided with a rotating drive for the conduit. The bearing pin can also have at its annular collar two diametrically opposite elastically deformable portions. Finally, the bearing pin can have at its outer surface area at least one portion which can deflect elastically radially relative to the rotating axis of the pin.

The above mentioned at least one portion at the outer surface area can be constructed as a tab which extends along a predetermined angle around the rotating axis of the pin, is securely connected at one end with the outer surface area, and cooperates in the bore hole wall surface of the bearing bush. The tab can be provided at its free end with a bead which projects over the contour of the outer surface of the pin.

The two elastically deflectable portions arranged at the annular collar of the bearing pin can be located so as to be rotated relative to the elastically deflectable portions of the outer surface of the bearing pin by approximately 90 degrees.

The elastic arm of the annular surface of the annular collar as well as the elastic tab at the outer surface area of the bearing pin can be effected exclusively by means of the end of the arm or of the tab which is securely connected with the bearing pin.

Finally, the bearing pin can be composed of an elastic plastic material and connected in one piece with the conduit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 shows a top view of the bearing pin as seen in the direction of arrow IV in FIG. 3;

FIG. 5 shows a section through the bearing pin along line V—V in FIG. 4;

FIG. 6 shows a section through ,the bearing pin along line VI—VI in FIG. 5; and

FIG. 7 shows a view of the bearing pin as seen in the direction of arrow VII in FIG. 5.

DESCRIPTION OF A PREFERRED EMBODIMENT

Figure 1:
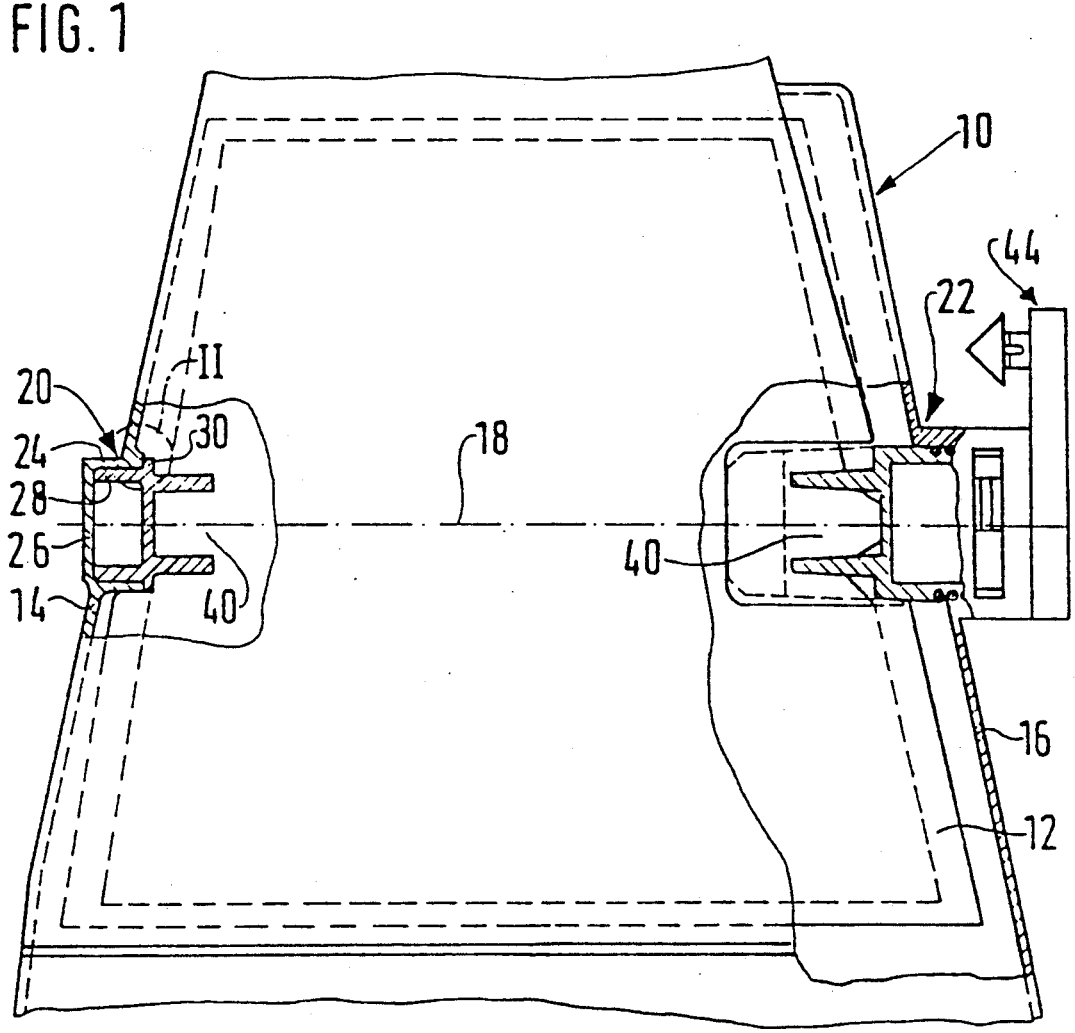
FIG. 1 shows a partial view of an air duct of an air conditioning system in a motor vehicle, partially in section in the area of a swivelable conduit.
Figure 2:
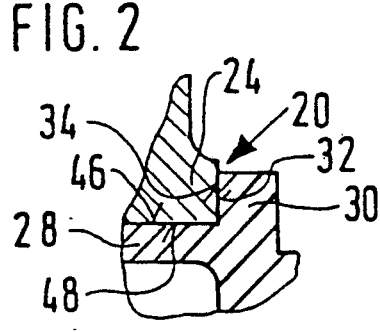
FIG. 2 shows a detail at II in FIG. 1 in enlarged scale.

FIG. 1 shows a view of a portion of an air duct 10 which is part of an air conditioning system of a motor vehicle. The air duct 10 leads to the passenger space of a motor vehicle, not shown. The portion of the air duct 10 comprises a swivelable air conduit 12 which guides air in a predetermined direction through partial ducts, not shown, depending on its respective operating position. The air conduit 12 is supported in two walls 14, 16 of the duct 10, which walls 14, 16 are located opposite one another and comprise plastic, in such a way that it is swivelable around a swivel axis 18. Accordingly, there results two pivot mountings 20 and 22 which are arranged at a distance from one another and are flush with one another, pivot mounting 20 will be considered in more detail in the following. It is clear that duct walls 14, 16 are stationary structural elements. As FIG. 1 further shows, the duct wall 14 comprises a bearing bush 24 which opens toward the interior of the duct 10. The bearing bush 24 is closed on its outer side by means of an end wall 26, so that the air duct 10 is absolutely tight in the area of the pivot mounting 20. Further, the bearing bush 24 receives a bearing pin 28 which is provided with an annular collar 30 which cooperates with the inner, annular end face 32 of the bearing bush 24, which annular end face 32 faces the annular collar 30. The annular end face 32 accordingly forms a shoulder surface at which a counter-shoulder surface 34 of the annular collar 30 of the bearing pin 28 is supported. This situation can be seen particularly from the enlarged view in FIG. 2.

The construction of the bearing pin 28 is explained in the following with the aid of FIGS. 3 to 7.

The bearing pin 28, which consists of an elastic plastic, first comprises a pin 36 which is guided in the bearing bush 24 and which leads up to the annular collar 30 or up to the counter-shoulder surface 34 of the annular collar 30 facing it. A projection, which is directed in the direction of the rotating axis 18 of the pin identical to the swivel axis 18 of the conduit 12 and forms a rotating drive 38 for the air conduit 12, is connected to the annular collar 30 on its side remote of the pin 36. As shown in FIG. 1, the air conduit 12 engages in receptacles 42 with tongues 40, so that a rotating drive is ensured between the bearing pin 28 and the conduit 12. The swiveling movement itself is conducted to the air conduit 12 via a lever 44 shown in FIG. 1 and via the pivot mounting 22, wherein the pivot mounting 22 is constructed in a manner similar to the described mounting 20. As further shown in FIGS. 1 and 2, the bearing pin 28 comprises an outer surface area 46 which, in the assembled state of the pivot mounting 20, is guided at the bore hole wall surface 48 of the bearing bush 24 with more or less play due to unavoidable manufacturing tolerances. In order to eliminate existing radial play of the bearing pin 36 in the bearing bush 24, the pin 36 comprises an elastically deformable portion 50 at its outer surface area 46, a relatively inelastic portion of the bore hole wall surface 48 of the bearing bush 24 cooperating with it is assigned to this elastically deformable portion 50. The elastically deformable portion 50 at the outer surface area 46 of the pin 36 is achieved in that it is constructed as a tab 50 which extends along a determined angle around the rotating axis 18 of the pin, is securely connected at one end with the outer surface area 46 and cooperates with the bore hole wall surface 48 of the bearing bush 24. For this purpose, the tab 50 comprises a bead 52 at its free end (FIGS. 4 and 7), which bead 52 projects over the contour of the outer surface area 46 of the pin by an amount 54. As shown particularly in FIG. 4, there are two elastically deformable portions or tabs 50 at the pin 36 which are arranged so as to be diametrically opposite one another. The arrangement of the two tabs 50 is effected in such a way that at least their bead 52 projects by an amount 54 over the diameter 56 of the pin 36 when the bearing pin 28 is not installed in the bearing bush 24.

Figure 3:
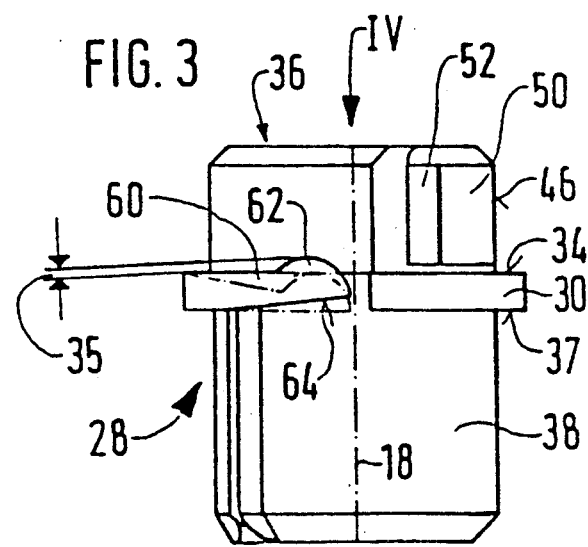
FIG. 3 shows the view of a bearing pin belonging to the swivel joint as seen in the direction of arrow III in FIG. 4.

FIGS. 3 to 7 further show that the annular collar 30 also has two diametrically opposite, elastically deformable portions 60. These two portions are formed by arms which are securely connected with the annular collar 30 only by one end. The arms are elastically deflectable particularly in the direction of the rotating axis 18 of the pin. As shown particularly in FIGS. 4 and 7, the arms 60 extend along a determined angle around the rotating axis of the pin. The two arms 60 are constructed in such a way that their free ends cooperate with the annular end face 32 of the bearing bush 24 assigned to them when the pin 36 is installed in the bearing bush 24. For this purpose, each arm 60 comprises, at its free end, a cam 62 which faces the annular end face 32 and which, in the relaxed state, i.e. when the bearing pin 28 is not installed, projects by an amount 35 over a plane situated transversely relative to the rotating axis 18 of the pin, which plane is formed by means of the counter-shoulder surface 34 of the annular collar 30. In addition, FIG. 3 shows in particular that the arm 60, with its surface 64 located opposite the cam 62, springs back relative to a plane formed by the end face 37 of the annular collar 30 remote of the outer surface area 46 of the pin 36. Thus, when the cam 62 cooperates with the annular end face 32 of the bearing bush 24 assigned to it, the arm 60 can deflect elastically into a position which is shown in FIG. 3 in dash-dot lines.

The arrangement of the tabs 50 and the arms 60 with respect to one another is effected in such a way that the latter are arranged so as to be rotated relative to one another by approximately 90 degrees with respect to the swivel axis 18 of the bearing pin 28. The elasticity of the two tabs 50 and the two arms 60 is achieved in that the latter are completely exposed along their entire circumference with respect to the annular collar 30 and/or with respect to the outer surface area 46 of the bearing pin 28. The one-piece connection of the tabs 50 and the arms 60 to the bearing pin 28 and to its bearing collar 30, respectively, is exclusively ensured in that these elastic portions are connected with the pin 36 and with the annular collar 30, respectively, at their ends remote of the beads 52 or the cam 62, respectively.

Thus, in the installed state, a considerable axial play in the mounting 20, 22 of the air conduit 12 is eliminated by means of the elastic arms 60 with their cams 62. Further, the tabs 50, in connection with their beads 52, ensure that the radial play of the pin 36 in the bearing bush 24 is prevented, since the beads 52 are supported at the bore hole wall surface 48 of the bearing bush 24 so as to be pretensioned. The magnitude of the play which can be eliminated is demonstrated in FIG. 4 by the amount 54 and in FIG. 3 by the amount 35. Accordingly, it is clear that at least one of the surfaces 32, 34 and 46, 48, respectively, which cooperate with one another, comprises at least one elastically deformable portion 60 and 50, respectively, which, in the relaxed state, projects over the contour which it occupies in the installed state, and accordingly in the tensioned state. Thus, the elastically deformable portions 50 and 60, respectively, are tensioned in the installed state, wherein they are supported at the counter-surfaces 48 and 32, respectively, cooperating with them. The play commonly present in the prior art is accordingly prevented.

It will be understood that each of the elements described above, or two or more together, may also find a useful application in other types of constructions differing from the types described above.

While the invention has been illustrated and described as embodied in a swivelable conduit, particularly for the air-conditioning system of the passenger space of a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed and desired to be protected by Letters Patent is set forth in the appended claims:

1. A swivelable conduit assembly, particularly for an air-conditioning system in a passenger space of a motor vehicle, comprising a stationary structural element; a swivelable conduit element; and two pivot mountings for mounting said swivelable conduit element on said stationary structural element and which are aligned with one another and arranged at a distance from one another, each of said pivot mountings having a first bearing member formed as a bearing bush connected with one of said elements and a second bearing member formed as a bearing pin connected with the other of said elements, said bearing members being provided with shoulder surfaces and counter-shoulder surfaces which face one another and determine a relative movement of said bearing members, said bearing members having surfaces which cooperate with one another, at least one of said surfaces of said bearing members having at least one elastically deformable portion which in a relaxed state before installing of said bearing members projects over a contour which it occupies in a tensioned state after installing of said bearing members.

2. A swivelable conduit assembly as defined in claim 1, wherein said bearing members have a surface which cooperates with said one surface and is formed as a relatively inelastic portion so as to oppose said elastic deformable portion.

3. A swivelable conduit assembly as defined in claim 1, wherein said bearing pin is formed as a separate structural member which is connectable with said elements.

4. A swivelable conduit assembly as defined in claim 1, wherein said bearing pin is rotatably supported in said bearing bush of said stationary structural element.

5. A swivelable conduit assembly as defined in claim 1, wherein said bearing pin has an annular collar with at least one section which forms said elastically deflectable portion and deflects elastically in direction of a rotating axis of said pin.

6. A swivelable conduit assembly as defined in claim 5, wherein said section of said annular collar is formed as an arm extending along a predetermined angle around the rotating axis of said pin, securely connected at one end with said annular collar, and cooperating with an annular surface of said bearing bush which acts as said counter-shoulder surface.

7. A swivelable conduit assembly as defined in claim 6, wherein said arm has a free end and is provided at said free end with a cam which projects over an annular end face which forms said shoulder surface and faces in direction of the rotating axis of said pin.

8. A swivelable conduit assembly as defined in claim 7, wherein said arm has a surface located opposite said cam and jumps with said surface relative to a plane which is formed by an end face of said annular collar remote of an outer surface area of said bearing pin.

9. A swivelable conduit assembly as defined in claim 5, wherein said bearing pin has a projection at an end face of said annular collar remote of its surface area, said projection being provided with a rotating drive for said conduit element.

10. A swivelable conduit assembly as defined in claim 5, wherein said bearing pin has at its outer collar two such diametrically opposite elastically deflectable portions.

11. A swivelable conduit assembly as defined in claim 1, wherein said bearing pin has an outer surface area and is provided at said outer surface area with said at least one elastically deformable portion which is deflectable elastically radially relative to a rotating axis of said pin.

12. A swivelable conduit assembly as defined in claim 11, wherein said elastically deformable portion at said outer surface area of said bearing pin is formed as a tab which extends along a predetermined angle around the rotating axis of said pin, is securely connected at one end with an outer surface area, and cooperates with a surface of said bearing bush.

13. A swivelable conduit assembly as defined in claim 12, wherein said tab has a free end and is provided at its free end with a bead which projects over a contour of an outer surface of said bead.

14. A swivelable conduit assembly as defined in claim 1, wherein said bearing pin has an outer surface area and is provided at said outer surface area with two such elastically deformable portions which are located diametrically opposite one another and deflect elastically.

15. A swivelable conduit assembly as defined in claim 10, wherein said bearing pin has an outer surface area and is provided at said outer surface area with two portions which are located diametrically opposite one another and can deflect elastically, said two diametrically opposite, elastically deflectable portions at said annular collar being arranged so as to be rotated relative to said two portions at said outer surface area of said bearing pin by approximately 90 degrees.

16. A swivelable conduit assembly as defined in claim 6, wherein said said bearing pin has an outer surface area and is provided at said outer surface area with said at least one elastically deformable portion which is deflectable elastically radially relative to a rotating axis of said pin, said elastically deformable portion at said outer surface area of said bearing pin is formed as a tab which extends along a predetermined angle around the rotating axis of said pin, is securely connected at one end with an outer surface area, and cooperates with a surface of said bearing bush, said elastic arm of said annular surface of said annular collar and said elastic tab and said outer surface of said bearing pin are formed exclusively by means of an end of said arm and said tab which is securely connected with said bearing pin.

17. A swivelable conduit assembly as defined in claim 1, wherein said bearing is composed of an elastic plastic material.

18. A swivelable conduit assembly as defined in claim 17, wherein said bearing pin is connected in one piece with said conduit so as to form a one-piece integral member.

* * * * *